(12) United States Patent
Kuroiwa

(10) Patent No.: US 10,388,210 B2
(45) Date of Patent: Aug. 20, 2019

(54) DEVICE AND METHOD FOR DRIVING DISPLAY PANEL IN RESPONSE TO DISPLAY DATA

(71) Applicant: Synaptics Japan GK, Tokyo (JP)

(72) Inventor: Tsuyoshi Kuroiwa, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 15/789,142

(22) Filed: Oct. 20, 2017

(65) Prior Publication Data

US 2018/0114480 A1 Apr. 26, 2018

(30) Foreign Application Priority Data

Oct. 21, 2016 (JP) .................................. 2016 206881

(51) Int. Cl.
| | |
|---|---|
| G09G 3/20 | (2006.01) |
| G09G 3/36 | (2006.01) |
| G09G 5/395 | (2006.01) |
| G09G 3/3225 | (2016.01) |
| G09G 5/00 | (2006.01) |
| H04L 1/00 | (2006.01) |

(52) U.S. Cl.
CPC ........... *G09G 3/2096* (2013.01); *G09G 5/395* (2013.01); *G09G 3/3225* (2013.01); *G09G 3/3648* (2013.01); *G09G 5/006* (2013.01); *G09G 2310/08* (2013.01); *G09G 2330/06* (2013.01); *G09G 2330/12* (2013.01); *G09G 2360/18* (2013.01); *G09G 2370/10* (2013.01); *H04L 1/0061* (2013.01)

(58) Field of Classification Search
CPC .. G09G 3/2096; G09G 5/395; G09G 2330/06; G09G 5/006; G09G 2360/18; G09G 2370/10; G09G 3/3225; G09G 2310/08; G09G 3/3648; G09G 2330/12; H04L 1/0061

See application file for complete search history.

(56) References Cited

U.S. PATENT DOCUMENTS

| | | | | |
|---|---|---|---|---|
| 2009/0174646 A1* | 7/2009 | Lim | ...................... | G09G 3/3677 345/100 |
| 2012/0218317 A1* | 8/2012 | Choi | .................... | G09G 3/3655 345/690 |
| 2015/0026506 A1* | 1/2015 | Lee | ...................... | G06F 11/0706 714/3 |

* cited by examiner

*Primary Examiner* — Abhishek Sarma

(74) *Attorney, Agent, or Firm* — Patterson + Sheridan, LLP

(57) ABSTRACT

A system and method for driving horizontal lines comprising detecting one or more errors within display data corresponding to one or more of the horizontal lines and generating second display data for a first horizontal line when the first display data for the first horizontal line is determined to include a data error, wherein the second display data is based on the first display data for a second horizontal line of the plurality of horizontal lines.

20 Claims, 11 Drawing Sheets

DEVICE AND METHOD FOR DRIVING DISPLAY PANEL IN RESPONSE TO DISPLAY DATA

CROSS REFERENCE

This application claims priority of Japanese Patent Application No. 2016-206881, filed on Oct. 21, 2016, the disclosure of which is incorporated herein by reference.

TECHNICAL FIELD

The present disclosure relates to a display driver, a display apparatus, and a method of driving a display panel.

BACKGROUND ART

In many current implementations, display data corresponding to an image to be displayed on a display panel is transmitted to a display driver that drives the display panel such as liquid crystal display panels and OLED (organic light emitting diode display) panels. Display data specifies a gray scale level of each of pixels, and a pixel circuit of each pixel of the display panel is driven in response to the display data.

When noise is applied onto a signal line for transmitting the display data, loss of the display data may occur in transmission of the display data to the display driver. For example, FIG. 1 is a timing chart showing an example of operation when the display data is transmitted over lane # i in the display apparatus using a serial interface based on MIPI DSI.

When noise is present on the lane #i, the display driver fails to receive data packets of the display data, and a loss of the display data occurs in the display driver. Especially, when high-voltage noise is continuously present, the display data corresponding to a series of pixels is lost and a display artifact is caused in a display image. FIG. 2 shows an example of display screen when the high-voltage noise is continuously present and a loss of the display data is caused. Display image artifacts are undesirable, and therefore there is a technical need for suppressing display artifacts of the display image due to failure of reception of the display data.

SUMMARY

In one embodiment, a display driver that drives a display panel, includes: an error detection circuitry configured to carry out an error detection of the first display data for each horizontal line of a display panel; a display data transfer circuitry configured to receive the first display data and output second display data. In one embodiment, the display data transfer circuit is configured to output the second display data for a first horizontal line based on the first display data for a horizontal line which is different from the first horizontal line, when a data error is detected in the first display data for the first horizontal line by the error detection circuitry.

In another embodiment, a display apparatus includes: a display panel; and a display driver configured to drive the display panel. The display driver may include: an error detection circuitry configured to carry out error detection of the first display data for each horizontal line; a display data transfer circuitry configured to receive the first display data and output second display data. The second display data may be for a first horizontal line and output based on the first display data for a horizontal line different from the first horizontal line. Further, the second display data may be outputted when the data error is detected in the first display data on the first horizontal line by the error detection circuitry.

In another embodiment, a method of driving a display panel includes: carrying out error detection to first display data for each horizontal line; outputting second display data based on a result of the error detection; and driving the display panel based on the second display data. The outputting the second display data includes: outputting the second display data for a first horizontal line based on the first display data for a horizontal line different from the first horizontal line, when the data error is detected in the first display data for the first horizontal line.

DETAILED DESCRIPTION

Figure 1:
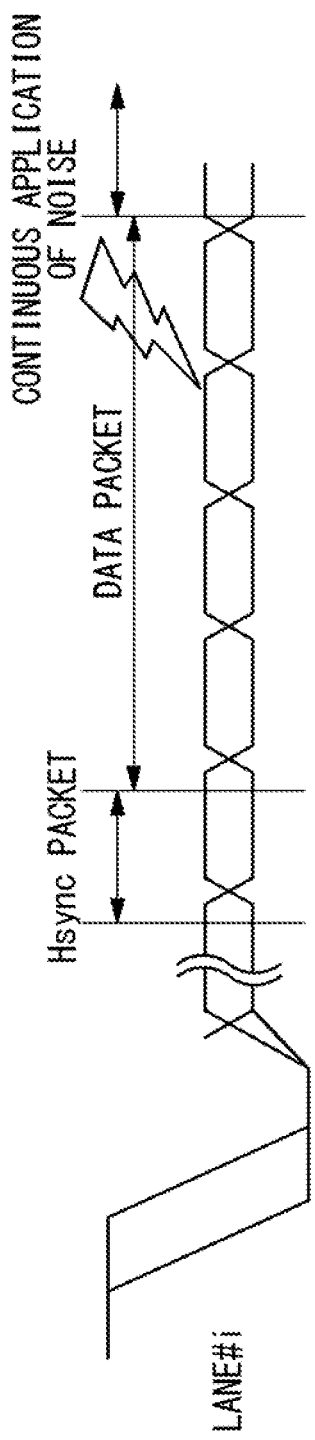
FIG. 1 is a timing chart showing an example of operation when display data is transmitted over lane #i, in a display system using a serial interface based on MIPI DSI.
Figure 2:
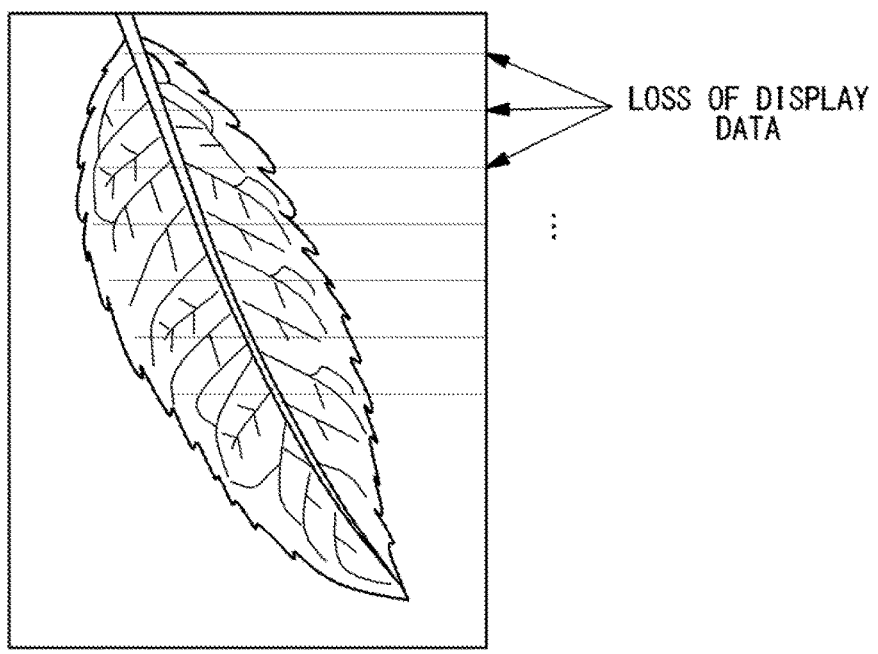
FIG. 2 shows an example of display screen when the transmission of display data is failed.

Hereinafter, the embodiments will be described with reference to the attached drawings. In the following description, same or corresponding components may be denoted by same or corresponding reference numerals.

Figure 3:
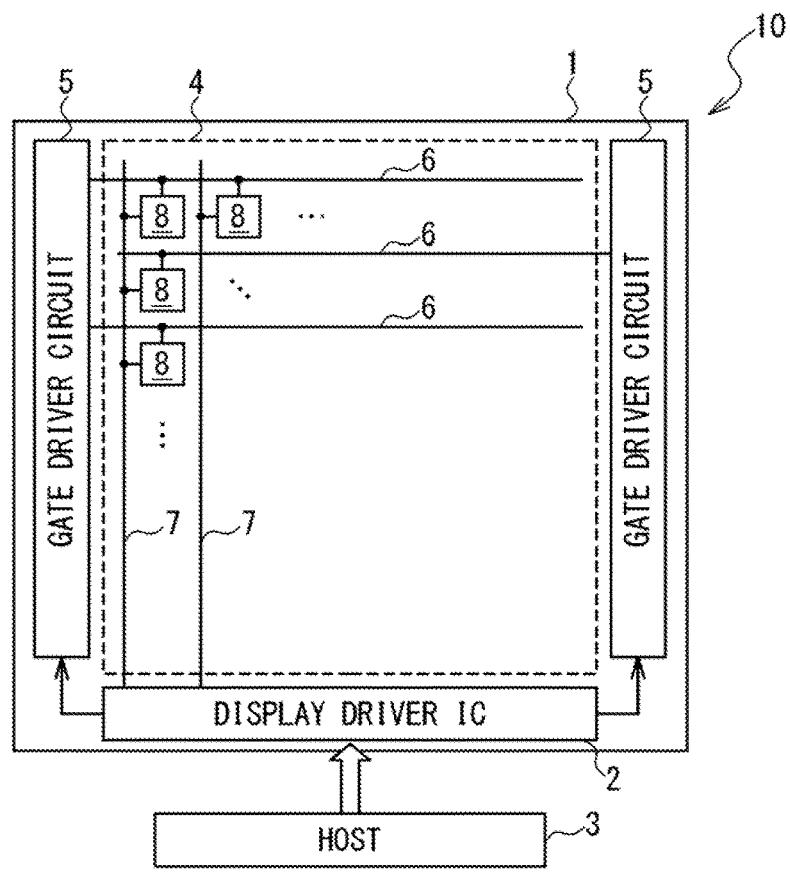
FIG. 3 is a schematic block diagram showing the configuration of a display apparatus according to one or more embodiments.

FIG. 3 is a block diagram schematically showing the configuration of a display apparatus 10 in an embodiment. The display apparatus 10 includes a display panel 1 and a display driver IC 2. The display apparatus 10 is configured to receive display data and control data from a host 3, and to display an image on the display panel 1 according to the received display data and control data. For example, as the display panel 1, a liquid crystal display panel and an OLED display panel may be used.

The display panel 1 includes a display area 4 and gate driver circuitries 5. A plurality of gate lines 6, a plurality of source lines 7 and a plurality of pixels 8 are arranged in a display area 4. The pixels 8 are arranged in a matrix. Each of the pixels 8 is disposed in a position where a corresponding gate line 6 and a corresponding source line 7 intersect, and has a pixel circuit. In one embodiment, when the display panel 1 is the liquid crystal display panel, the pixel circuit may contain a selection transistor, a pixel electrode and a pixel capacitance. In another embodiment, when the display panel 1 is the OLED display panel, the pixel circuit may contain a selection transistor, a drive transistor, a pixel capacitance and an organic diode device.

In the following description, the pixels 8 connected with one identical gate line 6 may be referred to as "a horizontal line". That is, the pixels 8 are arranged on the display panel 1 to configure a plurality of horizontal lines.

The gate driver circuitries 5 may be configured to drive the gate lines 6 in response to a control signal received from the display driver IC 2. In one embodiment, a pair of gate driver circuitries 5 is provided on both sides of the display area 4. The gate driver circuitries 5 are integrated on the display panel 1 by use of a CoG (Circuit-on-Glass) technique.

The display driver IC 2 drives the source lines 7 of the display panel 1 according to the display data and the control data received from the host 3. Moreover, the display driver IC 2 controls the gate driver circuitries 5, by supplying gate control signals to the gate driver circuitries 5.

Figure 4:
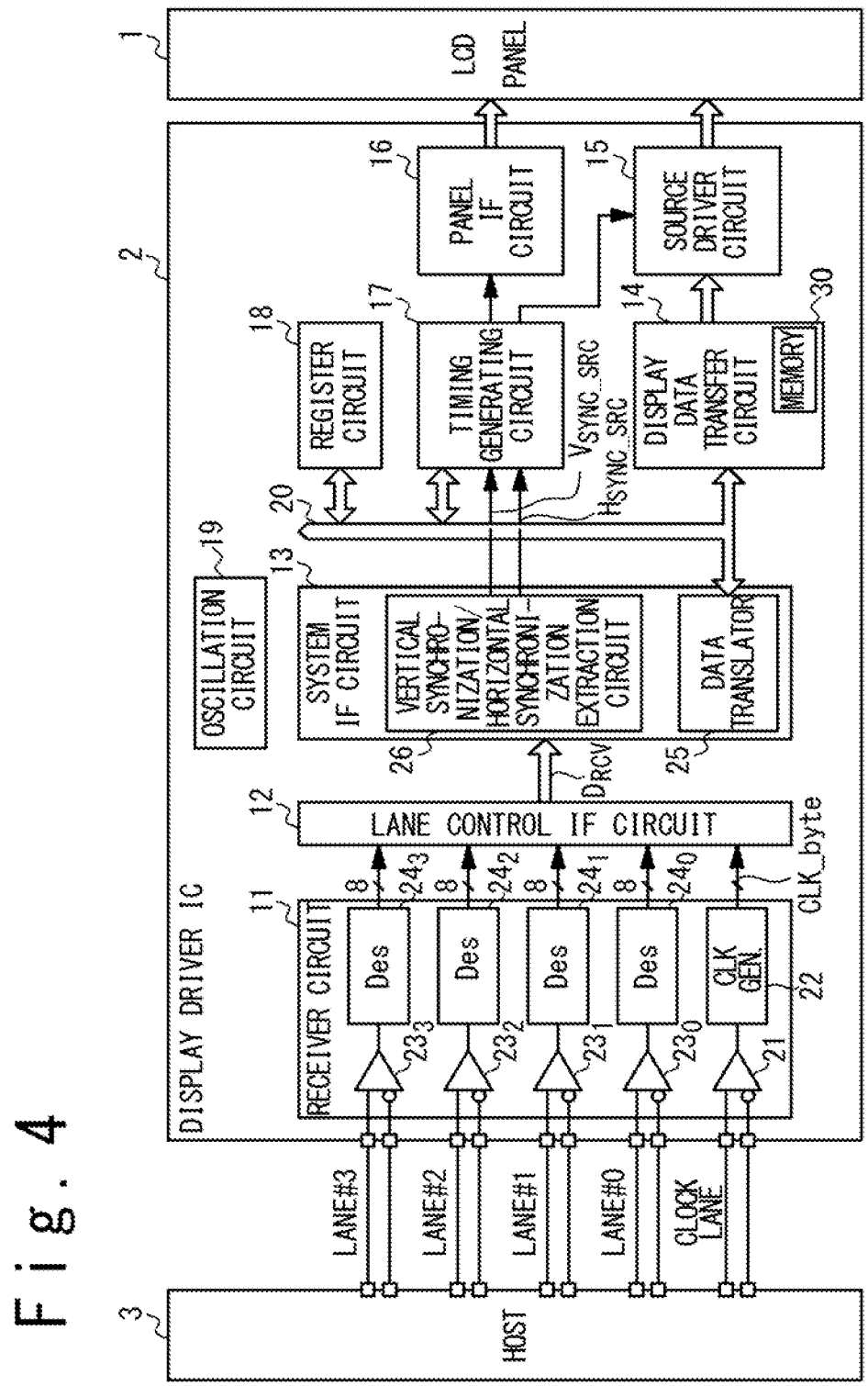
FIG. 4 is a block diagram showing the configuration of a display driver IC in according to one or more embodiments.

FIG. 4 is a block diagram showing the configuration of the display driver IC 2 according to one or more embodiments. In one embodiment, the communication between the display driver IC 2 and the host 3 is carried out by a serial interface based on MIPI DSI. More specifically, in one or more embodiments, the display driver IC 2 and the host 3 are connected by a clock lane and four data lanes: lane #0-#3. The clock lane may be used to supply a differential clock signal to the display driver IC 2 from the host 3, and the lanes #0-#3 are used to transmit a differential data signal to the display driver IC 2 from the host 3. Note that the number of lanes to be used may be optional and may be increased, depending on the resolution of the display panel 1.

Figure 5:
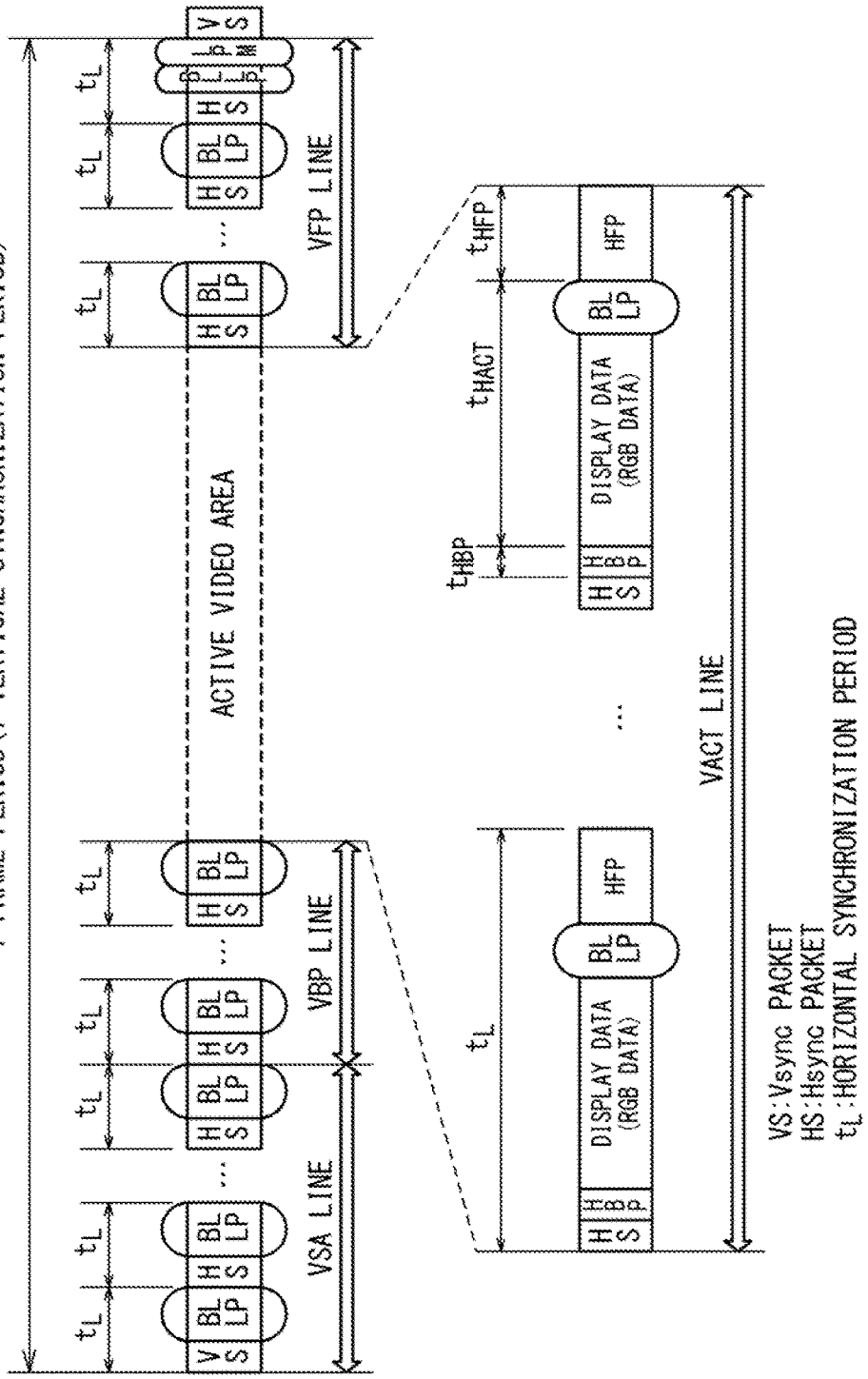
FIG. 5 shows a format of a data stream in case of communication from a host to a display driver IC according to one or more embodiments.

FIG. 5 is a diagram showing the format of a data stream in the communication to the display driver IC 2 from the host 3 in the present embodiment. Each frame period (vertical synchronization period) includes VSA line (vertical sync active lines), VBP lines (vertical back porch lines), VACT lines (video active lines) and VFP lines (vertical front porch lines). The Vsync packet (i.e. vertical synchronization packet) is transmitted to the display driver IC 2 from the host 3 when each frame period is started, and Hsync packet (i.e. horizontal synchronization packet) is transmitted to the display driver IC 2 from the host 3 when each horizontal synchronization period is started. In FIG. 5, the vertical synchronization packet is shown by a symbol "VS", the horizontal synchronization packet is shown by a symbol "HS". Also, in FIG. 5, a symbol "BLLP" shows Blanking or Low Power interval. In each horizontal synchronization period of the VACT lines, the display data (RGB data) is transmitted to the display driver IC 2 from the host 3.

Figure 6:
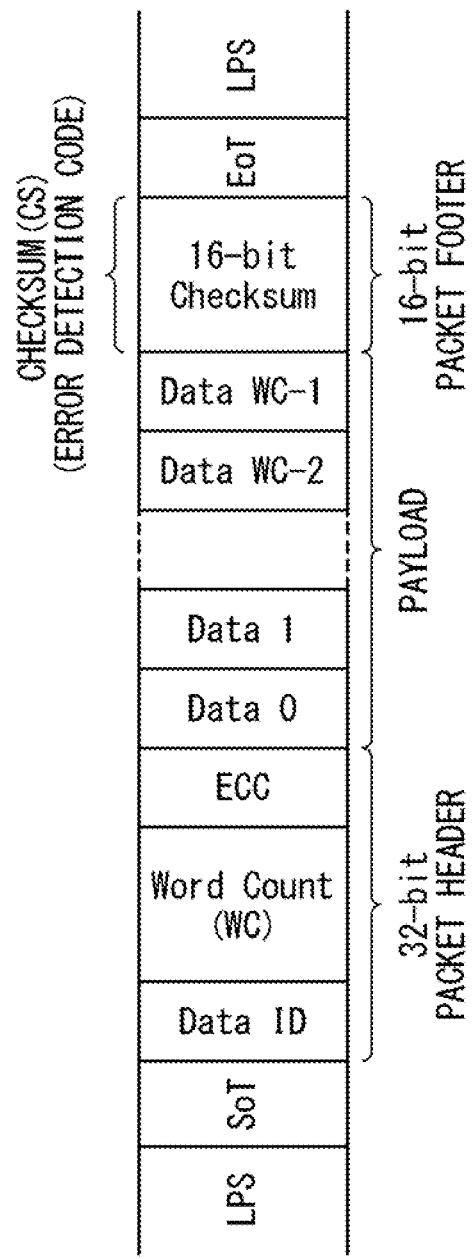
FIG. 6 shows the format of a packet when the display data is transmitted according to one or more embodiments.

FIG. 6 is a diagram showing the format of a packet to transmit the display data. In the present embodiment, the display data is transmitted by using MIPI DSI burst mode. Therefore, the data packet which transmits the display data has a long packet format.

In various embodiments, the data packet (long packet) which transmits the display data contains SoT (Start of Transmission), a packet header of 32 bits, a payload, and a packet footer of 16 bits, and EoT (End of Transmission). Note that in FIG. 6, the LPS shows "low power state".

The packet header may contain a data ID indicating the type of the packet, the word count (WC), and an error correction code (ECC). The data ID indicates the type of the data which is contained in the packet. The word count indicates the number of packet data contained in the packet. The ECC is used to carry out the error detection and the correction of the packet header.

The payload contains the packet data of the number indicated by the word count. The display data is stored in the payload as the packet data.

The packet footer contains an error detection code that is used for the error detection of the packet data contained in the payload. The MIPI-DSI standard prescribes that a checksum is used as this error detection code. As mentioned later, the error detection code (checksum) contained in the packet footer is used for the error detection of the display data for each horizontal line.

Returning to FIG. 4, the display driver IC 2 includes a receiver circuitry 11, a lane control interface (IF) circuitry 12, a system interface (IF) circuitry 13, a display data transfer circuitry 14, a source driver circuitry 15, a panel interface (IF) circuitry 16, a timing generation circuitry 17, a register circuitry 18 and an oscillation circuitry 19.

The receiver 21 may be configured to convert a differential clock signal transmitted through the clock lane from the host 3 into a clock signal of a single end. The clock generation circuitry 22 generates a dot clock signal (not shown) used in the receiver circuitry 11 and a byte clock signal CLK_byte used by the lane control interface circuitry 12, from the clock signal outputted from the receiver 21.

Each of the receivers $23_0$ to $23_3$ may be configured to convert a differential data signal transmitted through a corresponding one of the lanes #0-#3 from the host 3 into a single end signal. Each of the deserializers $24_0$ to $24_3$ may be configured to operate in synchronization with the dot clock signal to deserialize the single end signal received from a corresponding one of the receivers $23_0$ to $23_3$. In one embodiment, the deserializers $24_0$ to $24_3$ are configured to output deserialized data in the 8-bit data width.

The lane control interface circuitry 12 may be configured to receive the data from the deserializers $24_0$ to $24_3$ in synchronization with the byte clock signal CLK_byte, and integrates the received data to generate a reception data sequence $D_{RCV}$. The reception data sequence $D_{RCV}$ is supplied to the system interface circuitry 13.

The system interface circuitry 13 may be configured to distinguish the contents of data contained in the reception data sequence $D_{RCV}$ by a data translator 25 and carries out various types of processing according to the kind of the data to the data contained in the reception data sequence $D_{RCV}$. For example, the display data, and commands and parameters may be used for control of the display driver IC 2. In one embodiment, the system interface circuitry 13 is configured to transfer the display data of the reception data sequence $D_{RCV}$ to the display data transfer circuitry 14, and transfer the commands and parameters used for control of the display driver IC 2 to the timing generation circuitry 17 or the register circuitry 18 through the bus 20. In addition, in various embodiments, the system interface circuitry 13 includes a vertical synchronization/horizontal synchronization extraction circuitry 26 that may be configured to generate a vertical synchronization signal $V_{SYNC}$ and a horizontal synchronization signal $H_{SYNC}$.

The display data transfer circuitry 14 has a memory 30, and may be configured to temporarily store the display data received from the system interface circuitry 13, and transfers it to the source driver circuitry 15. The memory 30 has a capacity by which it is possible to store the display data for a plurality of horizontal lines. As the memory 30, a FIFO and a Video RAM (video random access memory) can be used. In embodiments where the Video RAM is used as the memory 30, the Video RAM has a capacity by which it is possible to store the display data corresponding to one frame image is used.

The source driver circuitry 15 may be configured to operate as driving circuitry that drives source lines 7 of the display panel 1 based on the display data received from the display data transfer circuitry 14.

The panel interface circuitry 16 may be configured to generate the gate control signals to be supplied to the gate driver circuitries 5 of the display panel 1.

The timing generation circuitry 17 may be configured to control the operation timing of each circuitry contained in the display driver IC 2 according to the command and parameters received from the system interface circuitry 13 and the register circuitry 18.

The register circuitry 18 may be configured to hold the commands and parameters used for control of the display driver IC 2.

The oscillation circuitry 19 may be configured to generate a clock signal used inside the display driver IC 2.

Figure 7:
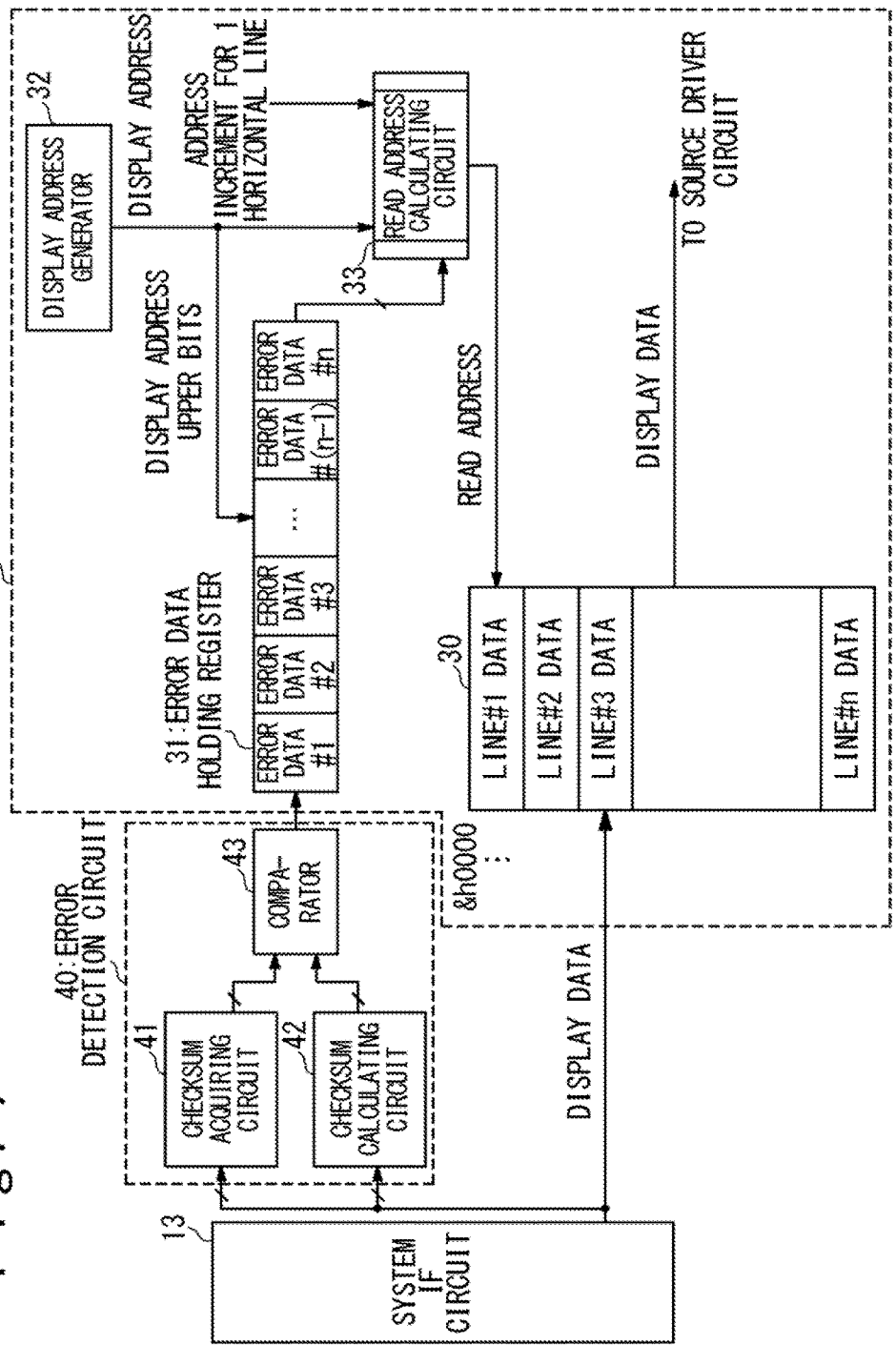
FIG. 7 is a block diagram showing the configuration of circuitry that transfers the display data to a source driver circuitry from a system interface circuitry according to one or more embodiments.

FIG. 7 illustrates a block diagram showing the configuration of circuitry configured to transfer the display data to the source driver circuitry 15 from the system interface circuitry 13. In one or more embodiments, the error detection circuitry 40 is configured to carry out error detection to the display data for each horizontal line. The display data transfer circuitry 14 is configured to transfer the display data stored in the memory 30 to the source driver circuitry 15 based on the result of the error detection. Hereinafter, the configurations of the error detection circuitry 40 and the display data transfer circuitry 14 will be described in detail.

The error detection circuitry 40 is configured to perform error detection of display data for each horizontal line by using the error detection code contained in the packet footer of the packet for transmitting the display data (the long packet). For example, the checksum may be employed by the error detection circuitry. In one or more embodiments, the error detection circuitry 40 includes a checksum acquiring circuitry 41, a checksum calculating circuitry 42 and a comparator 43. The checksum acquiring circuitry 41 is configured to acquire the checksum from the packet footer of the packet for transmitting the display data. The checksum calculating circuitry 42 is configured to calculate the checksum from the packet data stored in the payload of the packet for transmitting the display data. The comparator 43 is configured to compare the checksum acquired from the packet by the checksum acquiring circuitry 41 and the checksum obtained through the calculation by the checksum calculating circuitry 42, for error detection, and generate error data including the result of error detection. The error data may be generated for every horizontal line. For example, the error data outputted from the comparator 43 shows the result of error detection carried out to the display data for each horizontal line.

In various embodiments, the error detection code used for the error detection by the error detection circuitry 40 is not limited to the checksum. When another error detection code in the packet for transmitting the display data, e.g. a cyclic redundancy code is contained, the error detection may be carried out by using the other error detection code.

In one or more embodiments, the display data transfer circuitry 14 includes the memory 30, an error data holding register 31, a display address generator 32 and a read address calculating circuitry 33. In one embodiment, the memory 30 stores the display data for a plurality of horizontal lines. The memory 30 may be configured to store the display data for horizontal lines of the number which is fewer than the number of horizontal lines of the display panel 1. For example, an FIFO may be used as the memory 30. Also, in one or more embodiments, the memory 30 may be configured to store the display data for one frame image (e.g., the display data for the horizontal lines of the same number as the number of horizontal lines of the display panel 1). In such an embodiment, a Video RAM may be used as the memory 30. In one embodiment, the memory 30 is configured to store the display data for n horizontal lines. In FIG. 7, the display data for the horizontal line #k of the n horizontal lines is shown as "line #k data".

In one embodiment, the error data holding register 31 is configured to receive error data from the comparator 43 of the error detection circuitry 40 to store the received error data. Further, the error data holding register 31 may be configured to store the error data for each of the horizontal lines, the display data of which are stored in the memory 30. In FIG. 7, the error data to the horizontal line #k is shown as "error data #k".

The display address generator 32 may be configured to generate a display address to specify an address of the memory 30 storing the display data to be transferred to the source driver circuitry 15 in synchronization with the source driver circuitry 15 driving the display panel 1. For example, synchronization may be with the vertical synchronization signal $V_{SYNC}$ and the horizontal synchronization signal $H_{SYNC}$. In one embodiment, counting pulses contained in the vertical synchronization signal $V_{SYNC}$ and the horizontal synchronization signal $H_{SYNC}$ identifies the pixels 8 of the horizontal line of the display panel 1 to be driven by the source driver circuitry 15. Therefore, it is possible to determine the display data for horizontal line to be transferred to the source driver circuitry 15.

Note that the display address generated by the display address generator 32 may not always be used as the read address to read the display data from the memory 30. As describe below, the read address is determined based on the display address generated from the display address generator 32 by the read address calculating circuitry 33.

In various embodiments, the read address calculating circuitry 33 is configured to receive the error data from the error data holding register 31, and determine the read address based on the display address while referring to the received the error data. The memory 30 may be further configured to read out the display data from the read address received from read address calculating circuitry 33 and output the read-out display data to the source driver circuitry 15. In various embodiments, the read address calculating circuitry 33 is configured to determine the read addresses as follows.

In various embodiments, when the read-out of the display data for a first horizontal line is specified based on the display address, and the error data shows that there is no data error in the display data for the first horizontal line, the read address calculating circuitry 33 determines that the display address is the read address. Further, the horizontal line from which the display data should is read may be specified by the upper bits of the display address.

In one or more embodiments, when the error data shows that there is a data error in the display data for the first horizontal line, the read address is determined such that the display data for a horizontal line different from the first horizontal line is read from the memory 30. In one embodiment, when the data error is detected in the display data for the first horizontal line and any data error is not detected in the display data for the horizontal line adjacent to the first horizontal line, the read address is determined such that the display data for the adjacent horizontal line is read. For example, by adding or subtracting an address increment for one horizontal line to or from the display address, the read address can be determined such that the display data for the adjacent horizontal line is read. In this case, when no data error is detected in both of the two horizontal lines adjacent to the first horizontal line, the read address may be determined such that the display data for one of the two horizontal lines is read. In addition, when a data error is detected in the display data for the first horizontal line, and the data error is detected in both of the two horizontal lines adjacent to the first horizontal line, the read address may be determined such that the display data is read from a horizontal line closest to the first horizontal line, of the horizontal lines from which the data error is not detected.

Detecting and updating a display line as described above reduces display artifacts and improves the ability for the display data to be effectively displayed when the data error of the display data occurs. In various embodiments, the display data of a neighbor horizontal line is similar generally. Therefore, when the transmission of the display data for the first horizontal line fails so that a data error occurs, display artifacts can be restrained if the display data of a horizontal line near to the first horizontal line (most typically, neighbor horizontal line) is used instead of the display data for the first horizontal line.

Figure 8:
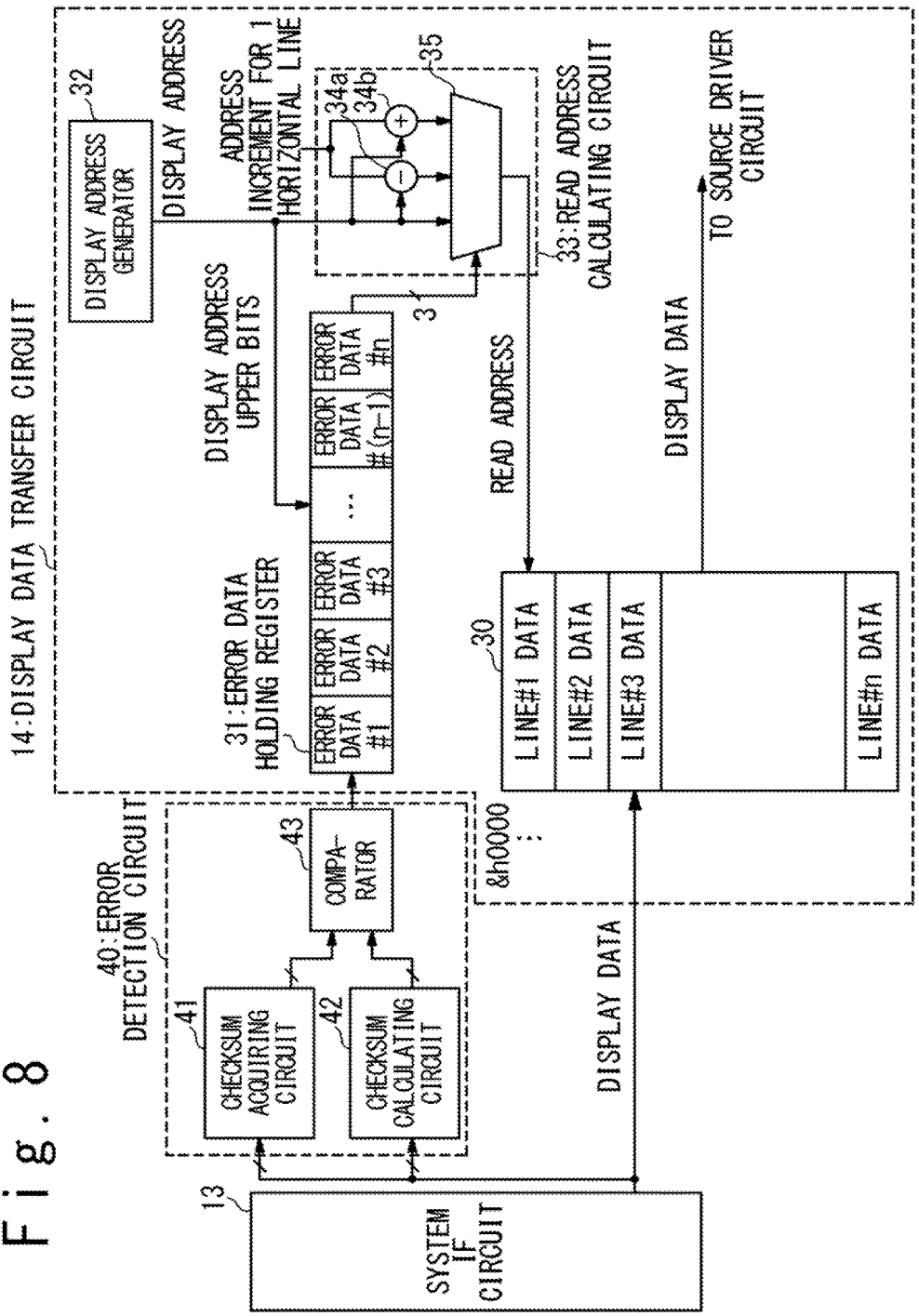
FIG. 8 shows an example of configuration of a read address calculating circuitry according to one or more embodiments.

As the read address calculating circuitry 33, various configurations can be adopted according to the logic to determine the read address. FIG. 8 shows an example of configuration of read address calculating circuitry 33. In the configuration of FIG. 8, the read address calculating circuitry 33 includes a subtractor 34a, an adder 34b, and a selector 35. In one embodiment, the adder 34b calculates a value obtained by adding an address increment for one horizontal line to the display address, and the subtractor 34b calculates a value obtained by subtracting the address increment for one horizontal line from the display address. The selector 35 receives the error data for the horizontal line corresponding to the display address and the error data for the horizontal line neighbor to the horizontal line corresponding to the display address from the error data holding register 31, and selects one from the following three addresses based on the received error data: the display address itself; an address obtained by adding the address increment for one horizontal line to the display address; and an address obtained by subtracting the address increment for one horizontal line from the display address. The selected address is supplied to the memory 30 as the read address, and is used to read the display data from the memory 30. In various embodiments, the address obtained by adding the address increment for one horizontal line to the display address and the address obtained by subtracting the address increment for one horizontal line from the display address are addresses corresponding to the horizontal lines adjacent to the horizontal line corresponding to the display address.

Figure 9:
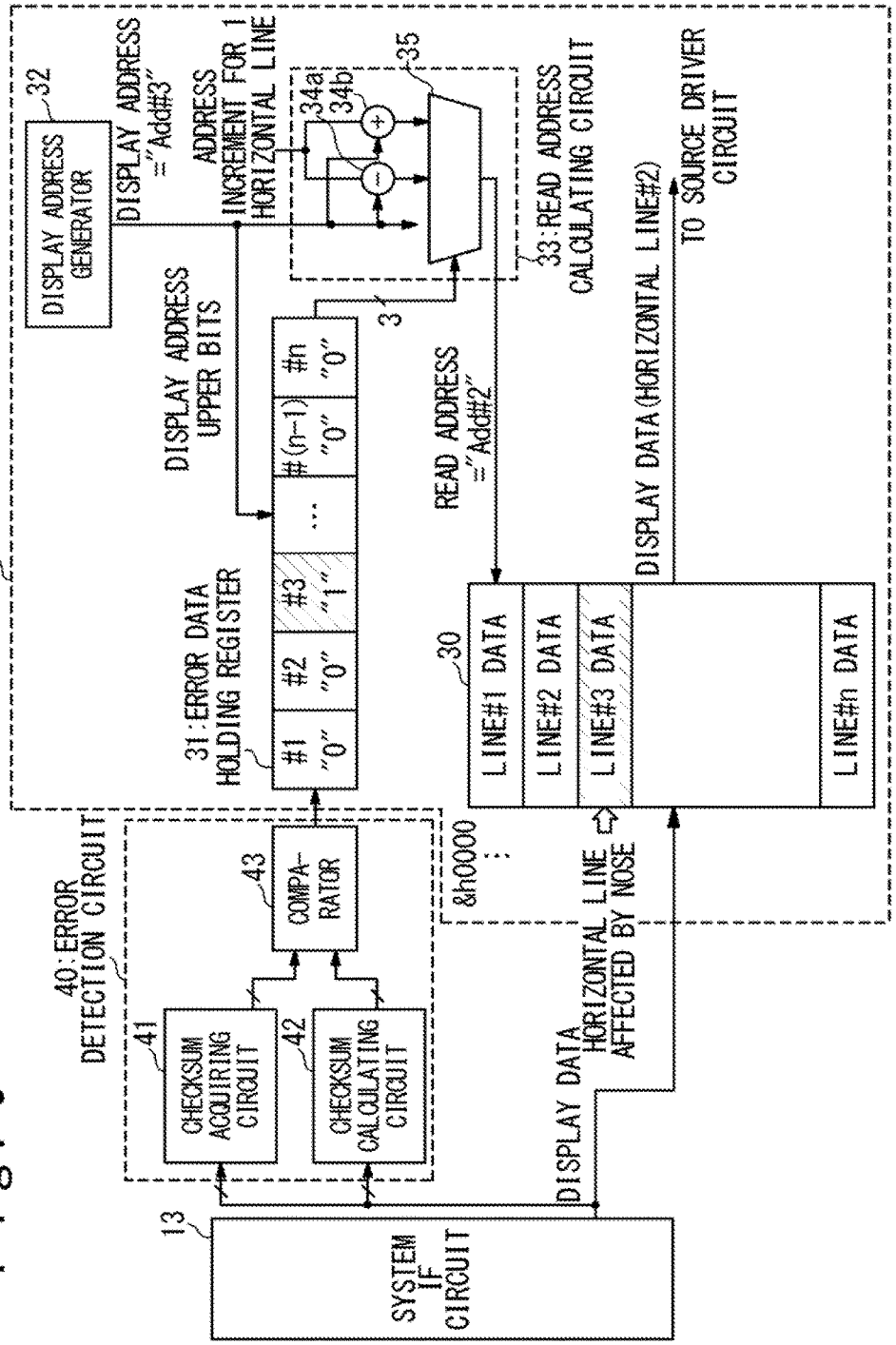
FIG. 9 is a block diagram showing an example of display data transfer operation according to one or more embodiments.

FIG. 9 is a block diagram showing an example of transfer operation of the display data in embodiments employing the read address calculating circuitry 33 having the configuration shown in FIG. 8. In the operation of FIG. 9, the display data for the horizontal lines #1 to #n are stored in the memory 30, and the error data for the horizontal lines #1 to #n are saved in the error data holding register 31. Also, when the display data for the horizontal line #3 is to be transmitted to the display driver IC 2, high-voltage noise affects the horizontal line #3 and it is supposed that a data error has occurred in the display data for the horizontal line #3. In this case, the data error to the display data for the horizontal line #3 is detected by the error detection circuitry 40, and the value of "1" is set as the error data for the horizontal line #3. It is supposed that no data error is detected for other horizontal lines and the value of "0" is set as the error data for each of the other horizontal lines.

When the address corresponding to the horizontal line #3 is specified as the display address generated by the display address generator 32, the error data for the horizontal line #3 and the horizontal lines neighbor to the horizontal line #3 (the horizontal lines #2 and #4) according to the upper bits of the display address are selected. The selected error data are supplied to the selector 35 of the read address calculating circuitry 33. In the one or more embodiments, the error data for each horizontal line is 1-bit data, and, the error data of 3 bits is supplied to the selector 35.

In other embodiments, because the display address corresponding to the horizontal line #3 is supplied to the selector 35, the selector 35 selects as the read address, one of the address corresponding to the horizontal line #2, the address corresponding to the horizontal line #3, and the address corresponding to the horizontal line #4. The selection of the read address is carried out based on the error data received from the error data holding register 31.

In one example embodiment of the operation of FIG. 9, the error data shows that the data error occurs in the display data for the horizontal line #3, and the data error does not occurs in the display data for the horizontal line #2. Therefore, the selector 35 selects the address corresponding to the horizontal line #2 as the read address. The memory 30 transfers the display data for the horizontal line #2 to the source driver circuitry 15 according to the read address received from the selector 35.

The source driver circuitry 15 may originally drive the display panel according to the display data for the horizontal line #2 at the timing to drive the display panel 1 according to the display data for the horizontal line #3. However, the display data for the horizontal line #2 is generally similar to the display data to be sent to the display driver IC 2 as the display data for the horizontal line #3. Therefore, even if the transmission of the display data for the horizontal line #3 fails, artifacts within the display image displayed on the display panel 1 can be restrained.

Figure 10:
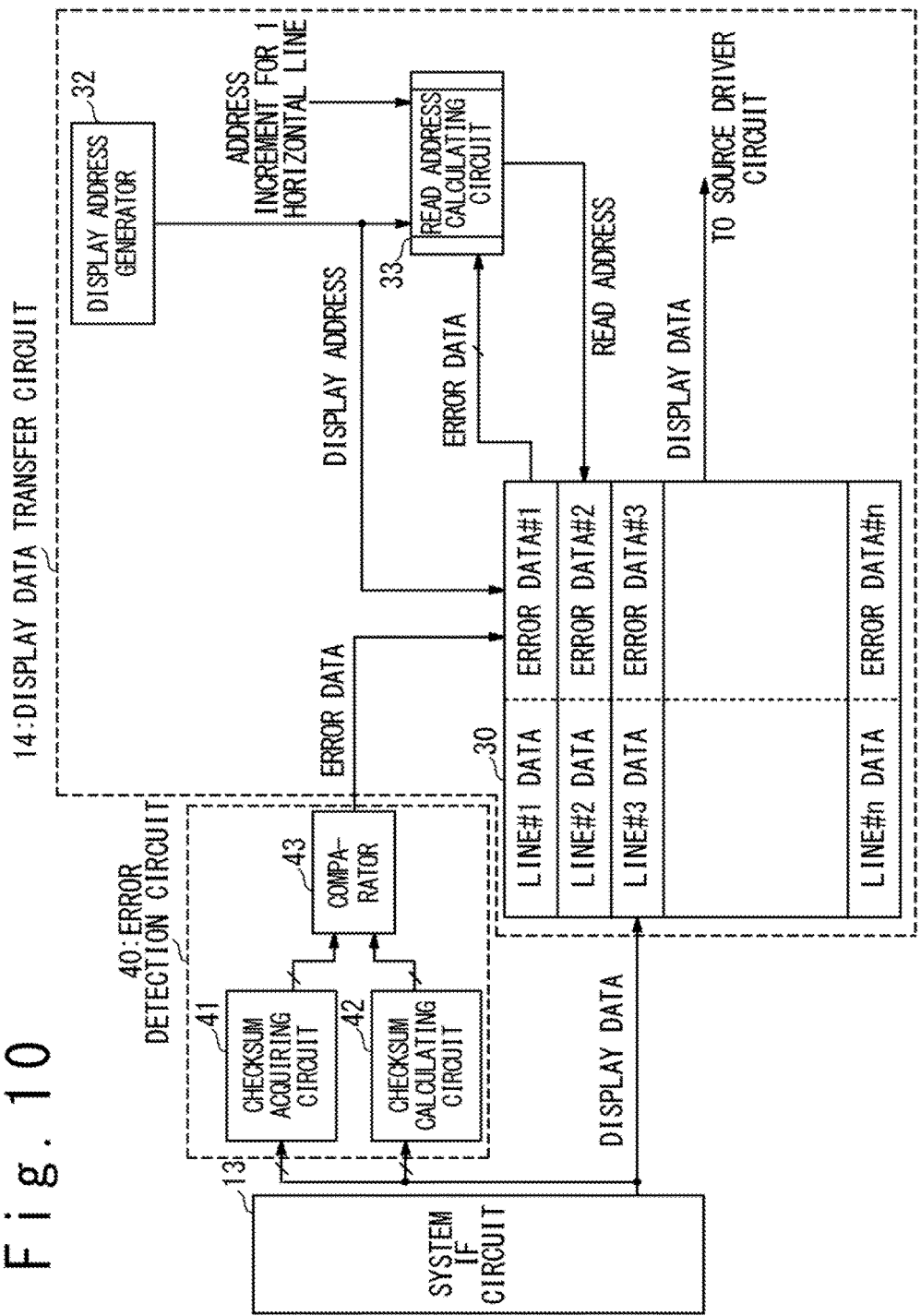
FIG. 10 is a block diagram showing the configuration of the display data transfer circuitry according to one or more embodiments.

The configuration of display data transfer circuitry 14 may be variously changed or modified. FIG. 10 is a block diagram showing another configuration of the display data transfer circuitry 14. In the configuration of FIG. 10, an area where the error data is stored (an error data storage area) is provided in the memory 30, and the error data holding register 31 is not provided independently.

In the configuration of FIG. 10, the error data storage area is provided to store the error data for each horizontal line in correspondence to the area which stores the display data for each horizontal line. The error data outputted from the error detection circuitry 40 is stored in the error data storage area.

In one or more embodiments, the display data transfer circuitry 14 in the configuration of FIG. 10 operates as follows. The display address generated by the display address generator 32 is supplied to the memory 30. The memory 30 outputs the error data from the error data storage area to the address calculating circuitry 33 in response to the supplied display address. In one embodiment, when the address corresponding to a first horizontal line is specified as the display address, the error data for the first horizontal line and the horizontal lines neighbor to the first horizontal line are supplied to the read address calculating circuitry 33.

The read address calculating circuitry 33 refers to the received error data to determine a read address based on the display address. The determining of the read address is carried out according to the above-mentioned procedure. The memory 30 outputs the display data read based on the read address received from the read address calculating circuitry 33 to the source driver circuitry 15.

Also, in the above-mentioned embodiment, when a data error is detected in the display data for the first horizontal line, the display data for the horizontal line different from the first horizontal line (the neighbor horizontal line) is read from the memory 30 and is supplied to the source driver circuitry 15. However, display data obtained by carrying out calculation based on the display data for a plurality of horizontal lines different from the first horizontal line (for example, two neighbor horizontal lines) may be sent to the source driver circuitry 15.

Figure 11:
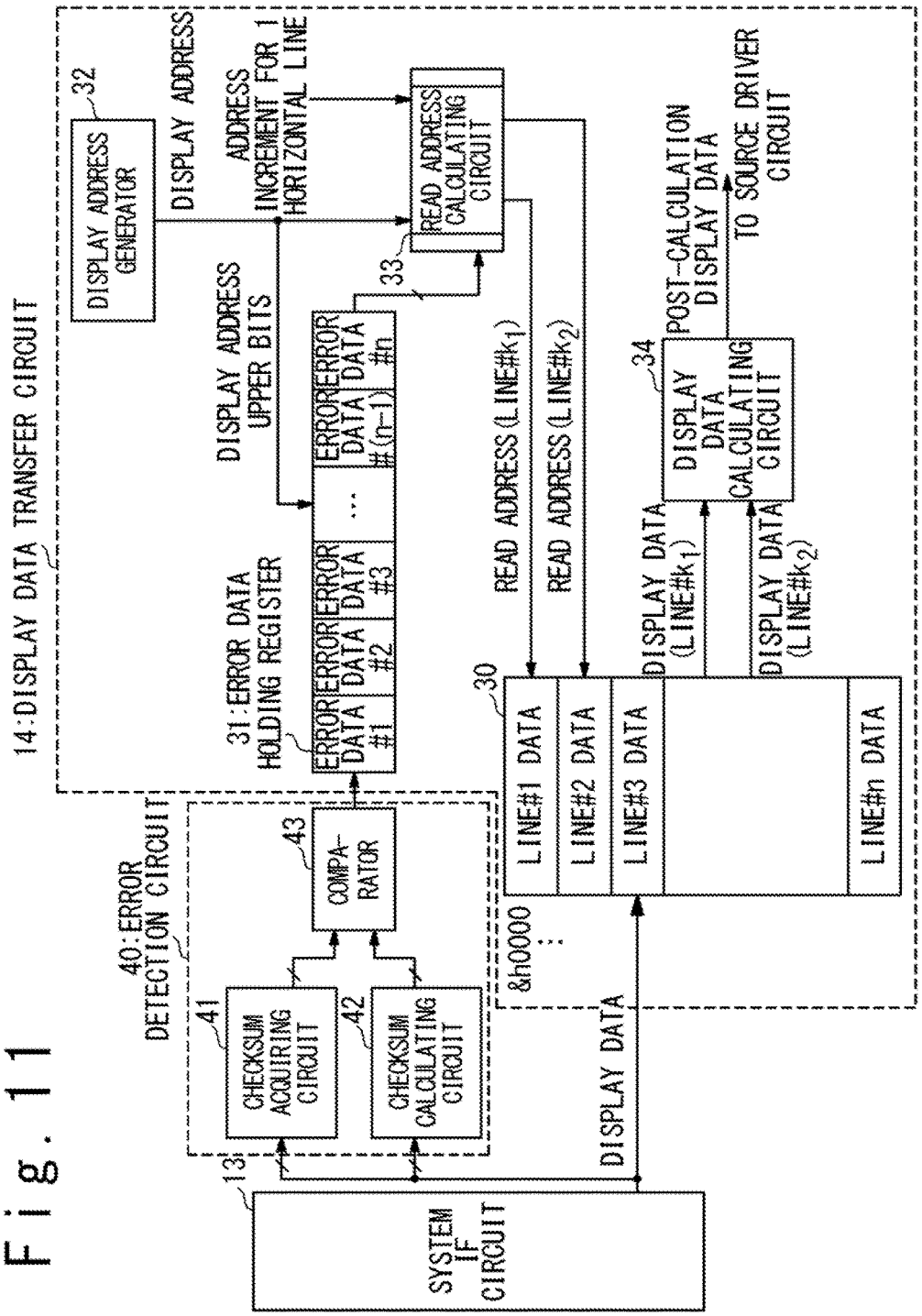
FIG. 11 is a block diagram showing the configuration of the display data transfer circuitry according to one or more embodiments.

FIG. 11 is a block diagram showing the configuration of the display data transfer circuitry 14 corresponding one or more embodiments. In the configuration of FIG. 11, the display data transfer circuitry 14 includes a display data calculating circuitry 34. Also, the read address calculating circuitry 33 determines two read addresses from the display address generated by the display address generator 32 and the error data received from the error data holding register 31. Each of the two read addresses corresponds to the first horizontal line. The display data for the two horizontal lines corresponding to the two read addresses are read from the memory 30 and are supplied to the display data calculating circuitry 34. The display data calculating circuitry 34 carries out the calculation to the display data for the two horizontal lines read from the memory 30 and generates the display data after the calculation. In various embodiments, when the display data for the two horizontal lines are identical, the display data calculating circuitry 34 carries out a calculation for the display data to become identical as the display data for the two horizontal lines. In the one embodiment, the display data calculating circuitry 34 generates the post-calculation display data by averaging the display data of pixels corresponding to the two horizontal lines. The generated post-calculation display data is supplied to the source driver circuitry 15 and is used to drive the display panel 1.

In one or more embodiments, the display data transfer circuitry 14 of FIG. 11 is configured to operate as follows. When the display data for the first horizontal line is specified based on the display address, and the error data shows that there is no data error in the display data for the first horizontal line, the read address calculating circuitry 33 determines the read addresses in consideration that both of two read addresses are identical with the display address. The display data for the first horizontal line is read from the memory 30 and is supplied to the display data calculating circuitry 34. When the display data for the two horizontal lines supplied to the display data calculating circuitry 34 are identical to each other, the display data for the horizontal line corresponding to the display address is supplied to the source driver circuitry 15 after all, as the post-calculation display data, because the display data is identical with the post-calculation display data for the two horizontal lines.

In various embodiments, when the error data shows that there is a data error in the display data for the first horizontal line, read addresses are determined such that the display data for the two horizontal lines different from the first horizontal line are read from the memory 30. In one embodiment, when a data error is detected in the display data for the first horizontal line, and the data error is not detected in the display data for the two horizontal lines neighbor to the first horizontal line, two read addresses are determined such that the display data for the two neighbor horizontal lines are read. For example, one of the two read addresses may be determined as the address obtained by adding an address increment for one horizontal line to the display address, and the other read address may be determined as the address obtained by subtracting the address increment for one horizontal line from the display address. The two determined read addresses are supplied to the memory 30.

The display data for the two horizontal lines corresponding to the two determined read addresses may be read from the memory 30 and are supplied to the display data calculating circuitry 34. The display data calculating circuitry 34 may carry out an operation to the display data for the two horizontal lines read from the memory 30 and generates the post-calculation display data.

According to one or more embodiments, the display disorder when the data error of the display data has occurred can be further effectively restrained. In the above-mentioned operation, when the transmission of the display data for the first horizontal line fails and a data error is generated, the display data obtained by calculating the display data for the two horizontal lines neighbor to the first horizontal line (for example, the display data obtained by averaging the display data for the two horizontal lines) is used to the drive the display panel 1. Therefore, even if the transmission of the display data for the horizontal line fails, the artifacts within the display image displayed on the display panel 1 can be restrained.

As such above, the embodiments of the present disclosure have been specifically described. It would be apparent to a skilled person that the techniques in the present disclosure may be implemented with various changes and modifications.

What is claimed is:

1. A display driver, comprising:
an error detection circuitry configured to perform error detection of first display data for each horizontal line of a plurality of horizontal lines of a display panel; and
display data transfer circuitry configured to:
receive the first display data; and
output second display data for a first horizontal line of the plurality of horizontal lines when a data error is detected in the first display data for the first horizontal line, wherein the second display data is based on the first display data for a second horizontal line of the plurality of horizontal lines.

2. The display driver according to claim 1, further comprising drive circuitry configured to drive the display panel based on the second display data.

3. The display driver according to claim 1, wherein the display data transfer circuitry is further configured to output the first display data for the first horizontal line just when the first display data for the first horizontal line is determined to be free from the data error.

4. The display driver according to claim 1, wherein the display data transfer circuitry is further configured to output the first display data for a third horizontal line of the plurality of horizontal lines when the data error is detected in the first display data for the first horizontal line.

5. The display driver according to claim 4, wherein the display data transfer circuitry is configured to output the first display data for the third horizontal line when a data error is detected in the first display data for the first horizontal line and the first display data for the third horizontal line is determined to be free from data error, wherein the third horizontal line is a neighbor horizontal line to the first horizontal line.

6. The display driver according to claim 1, wherein the display data transfer circuitry has a memory configured to:
store the first display data for the plurality of horizontal lines; and
output the second display data for the first horizontal line based on the first display data stored in the memory.

7. The display driver according to claim 6, wherein the error detection circuitry is further configured to output error data showing a result of the error detection, and
wherein the display data transfer circuitry comprises:
an error data holding register configured to store the error data for each of the plurality of horizontal lines in which the first display data is stored in the memory;
a display address generator configured to generate a display address in synchronization with drive circuitry driving the display panel; and
read address calculating circuitry configured to generate a read address to the memory based on the error data and the display address stored in the error data holding register, and
wherein the memory is configured to output the first display data read out from the read address as the second display data.

8. The display driver according to claim 7, wherein the error data holding register receives upper bits of the display address, and supplies selection error data selected based on the upper bits from the error data to the read address calculating circuitry, and
wherein the read address calculating circuitry is configured to generate the read address in response to the selection error data.

9. The display driver according to claim 1, further comprising an interface configured to receive the first display data from an external device outside of the display driver.

10. A display apparatus comprising:
a display panel; and
a display driver configured to drive the display panel, the display driver comprising:
an error detection circuitry configured to perform error detection on first display data for each horizontal line of a plurality of horizontal lines; and
display data transfer circuitry configured to:
receive the first display data from an interface and output second display data; and
output second display data for a first horizontal line of the plurality of horizontal lines based on the first display data for a second horizontal line of the plurality of horizontal lines when a data error is detected in the first display data for the first horizontal line.

11. The display apparatus according to claim 10, wherein the display driver further comprises drive circuitry configured to drive the display panel based on the second display data.

12. The display apparatus according to claim 10, wherein the display data transfer circuitry is further configured to output the first display data for the first horizontal line just when the first display data for the first horizontal line is determined to be free from the data error.

13. The display apparatus according to claim 10, wherein the display data transfer circuitry is configured to output the first display data for a third horizontal line of the plurality of horizontal lines when the data error is detected in the first display data for the first horizontal line.

14. The display apparatus according to claim 10, wherein the display data transfer circuitry is configured to output the first display data for a third horizontal line when the data error is detected in the first display data for the first horizontal line and the first display data for the third horizontal line is determined to be free from a data error, wherein the third horizontal line is a neighbor to the first horizontal line.

15. The display apparatus according to claim 10, wherein the display data transfer circuitry has a memory configured to:
store the first display data for the plurality of horizontal lines; and
output the second display data for the first horizontal line based on the first display data stored in the memory.

16. The display apparatus according to claim 15, wherein the error detection circuitry is configured to output error data showing a result of the error detection, and
wherein the display data transfer circuitry comprises:
an error data holding register configured to store the error data for each of the plurality of horizontal lines in which the first display data is stored in the memory;
a display address generator configured to generate a display address in synchronization with drive circuitry driving the display panel; and
read address calculating circuitry configured to generate a read address to the memory based on the error data and the display address which are stored in the error data holding register, and
wherein the memory is configured to output the first display data read out from the read address as the second display data.

17. The display apparatus according to claim 16, wherein the error data holding register receives upper bits of the display address, and supplies selection error data selected based on the upper bits from the error data to the read address calculating circuitry, and
wherein the read address calculating circuitry is configured to generate the read address in response to the selection error data.

18. A method, comprising:
performing error detection on first display data for each horizontal line of a plurality of horizontal lines;
outputting second display data based on the error detection for a first horizontal line of the plurality of horizontal lines when the first display data for the first horizontal line is determined to contain error data, the second display data is based on first display data for a second horizontal line of the plurality of horizontal lines; and
driving a display panel based on the second display data.

19. The method according to claim 18, wherein outputting the second display data further comprises:
outputting the first display data for the first horizontal line just when the first display data for the first horizontal line is determined to be free from data error.

20. The method according to claim 18, outputting the second display data further comprises:
output the first display data for a third horizontal line of the plurality of horizontal lines when a data error is detected in the first display data for the first horizontal line.

* * * * *